United States Patent [19]

Fujii

[11] Patent Number: 5,168,411
[45] Date of Patent: Dec. 1, 1992

[54] TAPE CASSETTE AND RECORDING AND/OR REPRODUCING APPARATUS THEREFOR HAVING COOPERATIVE ELEMENTS FOR OPENING CASSETTE LID

[75] Inventor: Hiroshi Fujii, Tokyo, Japan

[73] Assignee: Sony Corporation, Tokyo, Japan

[21] Appl. No.: 682,461

[22] Filed: Apr. 9, 1991

[30] Foreign Application Priority Data

Apr. 20, 1990 [JP] Japan ................................. 2-104480

[51] Int. Cl.⁵ .......................................... G11B 23/087
[52] U.S. Cl. ................................................. 360/132
[58] Field of Search ........................ 360/132; 242/199

[56] References Cited

U.S. PATENT DOCUMENTS

| 4,646,191 | 2/1987 | Goto | 360/132 |
| 4,672,497 | 6/1987 | Ueda | 360/132 |
| 4,698,713 | 10/1987 | Kawada | 360/132 |

FOREIGN PATENT DOCUMENTS

0094087 11/1983 European Pat. Off. .

Primary Examiner—Robert S. Tupper
Attorney, Agent, or Firm—Alvin Sinderbrand; William S. Frommer

[57] ABSTRACT

A tape cassette comprises a housing with a mouth formed in its front edge portion through which a magnetic tape wound around a pair of tape reels accommodated in the housing can be withdrawn. An outer lid is upwardly pivotable for opening the mouth, and an inner lid is attached to the inner surface of the outer lid and is opened and closed in association with the outer lid. The outer lid and inner lid protect front and rear surfaces of the magnetic tape at a run thereof extending across the mouth. The outer lid is provided with a projecting abutment which is brought into contact with a lid opening member disposed in a VTR or similar recording and/or reproducing apparatus at least in a final phase of a lid opening action, whereby the outer lid is opened together with the inner lid so as to be largely separated from the magnetic tape. Therefore, the tape cassette provided with outer and inner lids can be loaded into an apparatus equipped with a lid opening member for opening a previously known tape cassette without an inner lid.

4 Claims, 6 Drawing Sheets

TAPE CASSETTE AND RECORDING AND/OR REPRODUCING APPARATUS THEREFOR HAVING COOPERATIVE ELEMENTS FOR OPENING CASSETTE LID

BACKGROUND OF THE INVENTION

1. Field of the Invention

The present invention relates to a tape cassette suitable for use in a tape recording and/or reproducing apparatus such as a video tape recorder (VTR) and the like.

2. Description of the Prior Art

A conventional tape cassette, for example a VHS video tape cassette, comprises a housing having a mouth formed in its front edge portion, a pair of tape reels mounted in the housing, a magnetic tape wound on the tape reels and having a run extending between the wheels across the mouth, and a lid pivotally attached to the housing for movement between a closed position in which the lid covers an outer surface of the tape run and an open position. Such a cassette is intended to be used with a tape apparatus which includes cassette positioning devices for defining a loaded position of the cassette in the apparatus, and a lid opening member arranged to engage the lid upon movement of the cassette to the loaded position for moving the lid towards the open position thereof. The lid therefore helps to protect the tape, when the cassette is not in use, and automatically opens when the cassette is inserted into the apparatus.

In one known form of cassette of this type, the mouth formed in the front edge portion of the housing is also open at the bottom of the cassette housing, so that tape loading guides of the apparatus can be inserted behind the run of the magnetic tape extending across the mouth to withdraw the magnetic tape from the cassette. Thus, when the cassette is not in the apparatus, dust can enter the mouth and be attracted to the magnetic tape, even if the front lid is closed. Also, a user's finger may accidentally enter the mouth and touch the magnetic tape, with the result that a fingerprint may be left on the tape. Such dust and fingerprints may cause dropout during a recording or reproducing operation. In order to deal with this problem, it has been proposed in Japanese Patent Application JP-A-58128070 to provide an inner lid linked to the aforementioned (outer) lid to open and close therewith such the inner lid, when closed, covers an inner surface of the tape run which extends across the mouth. Thus, when the cassette is not in use, the magnetic tape is maintained in a sealed state between the outer and inner lids, thereby providing a highly reliable tape cassette which prevents damage to the tape due to dust or the like. When such a tape cassette is loaded into a VTR apparatus, the tape cassette is guided to a cassette loading position, and the lower edge of the outer lid is pushed up by the lid opening member of the apparatus to cause the outer lid to rotate upwardly, while the inner lid, upon such rotation, is moved upwardly and rearwardly so that both the lids are opened away from the magnetic tape to open the mouth and permit the magnetic tape to be withdrawn and loaded into the apparatus.

With the type cassette, disclosed in JP-A-58128070, in order to open the inner lid sufficiently to clear the magnetic tape, it is necessary to rotate the front lid over a larger angular range than that required for the original or old-fashioned type of cassette without an inner lid. It is therefore necessary to provide a lid opening member in the tape apparatus which is higher than that which is required in an apparatus for the old-fashioned type of cassette. It is therefore impossible to use the above-described tape cassette provided with the inner lid in a VTR which is designed merely to be used with the old-fashioned type of tape cassette without an inner lid.

OBJECTS AND SUMMARY OF THE INVENTION

An object of the present invention is to provide a tape cassette of the type which has an outer lid and an inner lid for improved protection of the magnetic tape, and which can be used with a tape apparatus having a lid opening member which may have been designed merely to be used with the old-fashioned or original type of tape cassette lacking an inner lid.

In accordance with one aspect of the present invention, a tape cassette for a tape apparatus comprises a housing having a mouth formed in its front edge portion, a pair of tape reels mounted in said housing, a magnetic tape wound on and extending between the tape reels and having a run extending across the mouth, an outer lid pivotally attached to the housing for movement between a closed position, in which the lid covers an outer surface of the tape run and an open position, and an inner lid linked to the outer lid to open and close therewith such that the inner lid, when closed, covers an inner surface of the tape run to provide good protection of the tape. Moreover, in accordance with this aspect of the invention an abutment projects from the outer lid and is arranged to engage a lid opening member of the tape apparatus at least during a final phase of an opening movement of the outer lid such that, upon completion of the opening movement, the outer and inner lids are clear of the mouth. More particularly, the projecting abutment on the outer lid causes the outer lid to be opened further, as compared with the old-fashioned type of cassette, so that the inner lid is opened by an amount sufficient to avoid fouling of the tape or the tape loading mechanism of the apparatus when the tape is withdrawn from the cassette into the apparatus. Thus, the cassette according to this aspect of the invention can be used in a tape apparatus of the type having a lid opening member which may have been designed merely for use with the old-fashioned type of tape cassette, without the need for any modification of the tape apparatus.

In accordance with another aspect of the present invention, there is provided a combination of a tape apparatus and a tape cassette in which the cassette comprises a housing having a mouth formed in its front edge portion, a pair of tape reels mounted in the housing, a magnetic tape wound on and extending between the tape reels and having a run extending across the mouth, an outer lid pivotally attached to the housing for movement between a closed position in which the lid covers an outer surface of the tape run and an open position, and an inner lid linked to the outer lid to open and close therewith such that the inner lid, when closed, covers an inner surface of the portion of the tape; and in which the tape apparatus includes means for defining a loaded position of the cassette in the apparatus, and a lid opening member arranged to engage the outer lid upon movement of the cassette to the loaded position to move the outer lid and the inner lid towards the open positions thereof; and further in which an abutment projects from the outer lid and is arranged to engage the lid opening member at least during a final phase of movement of the cassette to the loaded position such that upon completion of the loading movement of the cassette the outer and inner lids are clear of the mouth.

The above, and other objects, features, and advantages of the present invention will become apparent from the following detailed description of an illustrative embodiment thereof to be read in conjunction with the accompany drawings, in which the like reference numerals represent the same or similar parts.

DETAILED DESCRIPTION OF THE PREFERRED EMBODIMENT

An embodiment of the present invention and modifications thereto will hereinafter be described with reference to the accompanying drawings in which the invention is shown applied to a tape cassette 1 for a VHS-type video tape recorder (VTR).

A cassette housing 1a is composed of upper and lower housing halves 2, 3 which are generally rectangular in plan view. The upper and lower housing halves 2, 3 are moulded of synthetic resin and are joined one above the other. A pair of tape reels 4, 5 are rotatably mounted within the cassette housing 1a, and a magnetic tape 6 runs between and is wound around both the tape reels 4, 5, as shown in FIG. 3.

Figure 3:
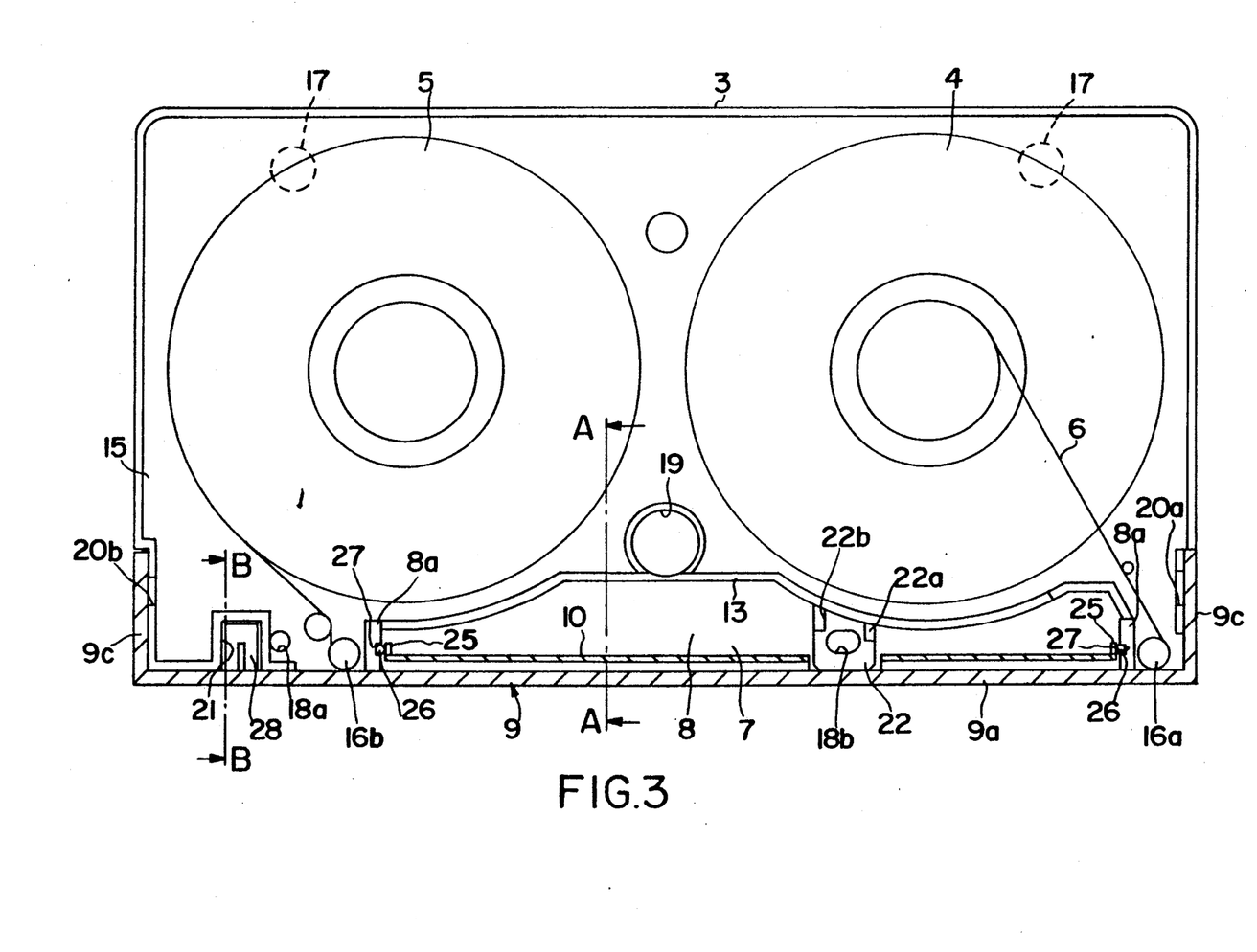
FIG. 3 is a sectional plan view of the tape cassette shown in FIG. 1.

The front of the cassette housing 1a is formed with a recess 7 which extends over a major portion of the length of the housing and is offset laterally to the right of center as seen in FIG. 3. The rear of the recess 7 is defined by mating concave front walls 12, 13 of the upper and lower housing halves 2, 3. An upper wall 14 of the upper housing half 2 has a forward portion 14a which extends forwardly from the front wall 12 while a front edge of a bottom wall 15 of the lower housing half 3 follows the shape of the front wall 13. The front walls 12, 13 of the upper and lower halves 2, 3 and the extended forward portion 14a of the upper wall 14 of the upper housing half 2 constitute a forwardly and downwardly opening mouth 8. The front of the mouth 8 may be closed by an outer lid 9 which is upwardly pivotable to open the mouth 8. The size of the housing composed of the upper and lower housing halves 2, 3 and the outer lid 9 is selected to be in accordance with VHS standards.

Figure 1:
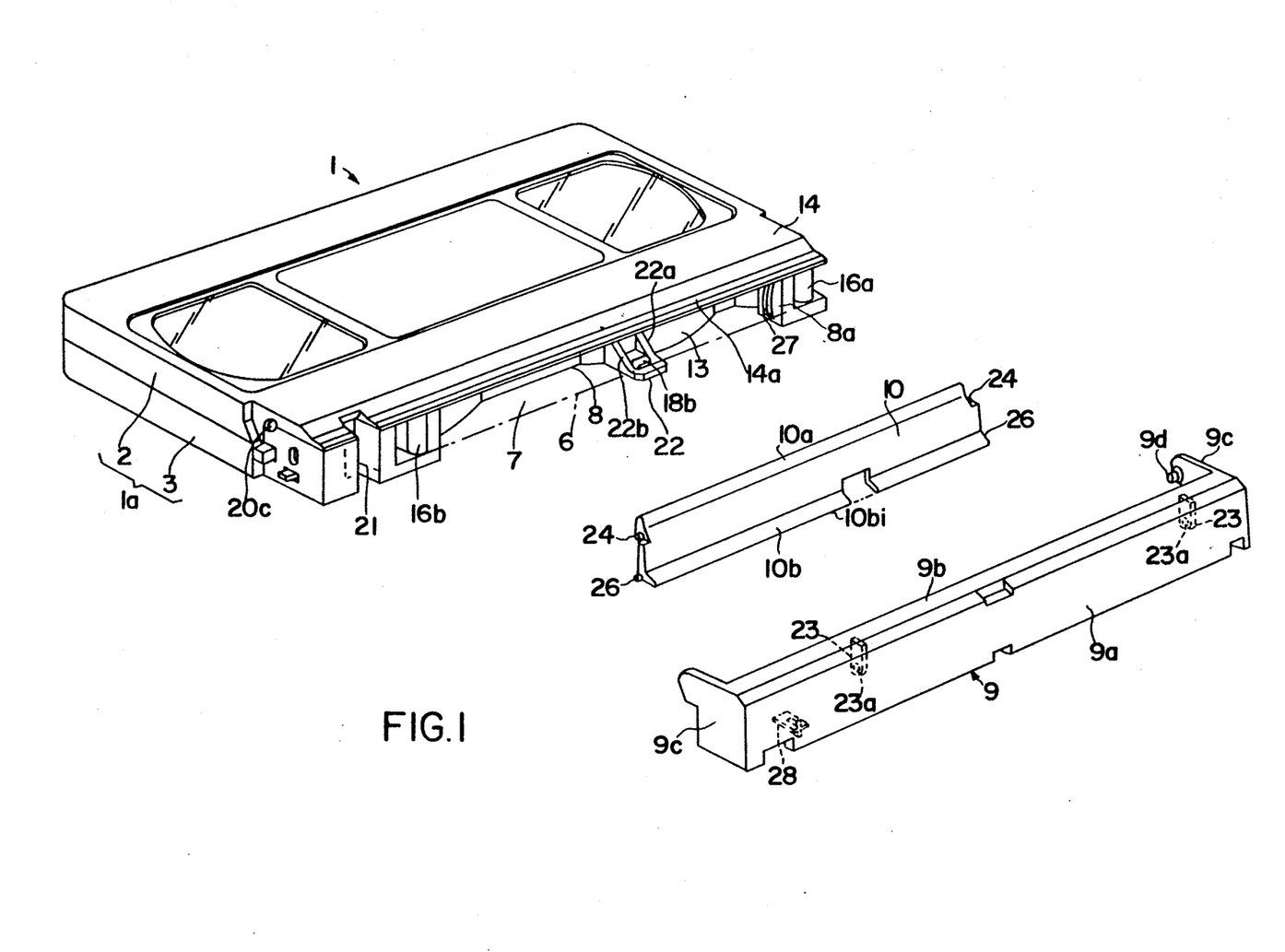
FIG. 1 is an exploded perspective view showing an embodiment of a tape cassette according to the present invention.

The lower housing half 3 is provided with tape guides 16a, 16b, mounted thereon, as well as with reference surface portions 17 (FIG. 3) for abutting corresponding reference surface portions 17a of a cassette supporting platform 40 (FIG. 2) in the tape apparatus, a circular hole 18a (FIG. 3) for a reference pin 18c (FIG. 2) on the platform 40, an elongate hole 18b (FIG. 3) for a further reference pin 18d (FIG. 2) on the platform 40, a hole 19 (FIG. 3) to receive a sensor 19a on the platform 40 (FIG. 2), light receiving windows 20a, 20b (FIG. 8), a recess 21 (FIG. 3) for receiving a lid opening member 30 (FIG. 2) on the platform 40, and so on, so as to meet the requirements of the VHS standards. The elongate hole 18b is shown to be formed in a tongue 22 which extends in the mouth 8 from the lower edge of the being formed between the tongue 22 and the front wall 13. The outer lid 9 includes a front wall 9a with ears 9c directed rearwardly from its opposite side ends. Pins 9d extend inwardly from the ears 9c (FIG. 1) and are rotably positioned in holes 20c at opposite sides of the housing 1a for pivotally mounting the outer lid 9 thereon.

The outer lid 9 is provided with an inner lid 10 movably attached thereto with a predetermined gap between the outer and inner lids 9, 10 when the outer lid is in a closed position. More specifically, the substantially U-shaped outer lid 9 is provided with left and right brackets 23 projecting from the inner surface of an upper wall 9b of the outer lid contiguous with the front wall 9a thereof. A pair of supporting pins 24 project from an upper portion of the inner lid 10 at its left and right ends and are inserted into respective pin holes 23a formed through the brackets 23. The inner lid 10 is offset laterally to the right of center as seen in FIG. 3.

The inner lid 10 is therefore pivotable relative to the outer lid 9 about the pair of supporting pins 24. In the closed condition of the lids shown in FIG. 4A, an upper edge 10a of the inner lid 10 contacts the inner surface of the upper wall 9b of the outer lid 9 while a forwardly-slanting lip 10b along the lower edge of the inner lid contacts the inner surface of the front wall 9a of the outer lid 9. A pair of brackets 25 project rearwardly from the slanting lip 10b of the lower edge of the inner lid 10 at its left and right ends, and a pair of guide pins 26 project in the left and right directions from the brackets 25. These guide pins 26 slidably engage respective guide grooves 27 formed in the inwardly facing surfaces of left and right inner walls 8a defining the ends of the mouth 8 of the cassette housing 1a.

Near the left hand end, as viewed in FIG. 3, of the outer lid 9, an abutment 28 projects rearwardly from the inner surface of the outer lid 9, near the lower edge of the lid 9 in correspondence with a recess 21 formed near one end of the front surface of the cassette housing 1a or the lower housing half 3. The projection 28 enters the recess 21 from the front as the outer lid 9 is moved to its closed state, that is to say, as the mouth 8 of the cassette housing 1a is closed by the outer lid 9.

Figure 4A:
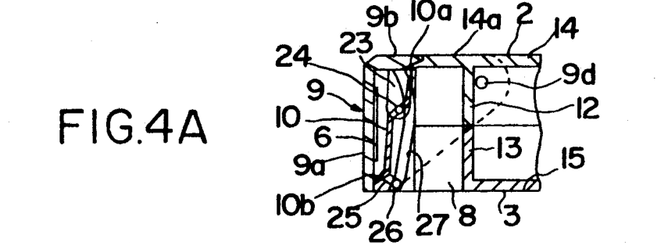
FIGS. 4A to 4D are a series of fragmentary cross-sectional views, taken along a line A—A in FIG. 3, for explaining a lid opening action of the cassette.

The run of the magnetic tape 6, which extends across the mouth 8 of the tape cassette 1, is thus usually covered by the outer lid 9 at its front side as well as by the inner lid 10 at its rear side, as shown in FIGS. 3 and 4A. In such closed position, as mentioned above, the inner lid 10 has its upper and lower edges in contact with the front lid 9 so that the portion or run of the magnetic tape 6 positioned within the mouth 8 is sealed and protected by the lids from being damaged due to dust or the like. Such substantially complete protection of the magnetic tape substantially improves the reliability of the tape cassette.

When the tape cassette 1 is inserted into a video tape recorder, the outer lid 9 and inner lid 10 are opened to expose the front and rear surfaces of the magnetic tape 6 while tape loading guides (not shown) are inserted into the mouth 8 from below, thereby to enable the loading of the magnetic tape 6 into the recorder.

Figure 2:
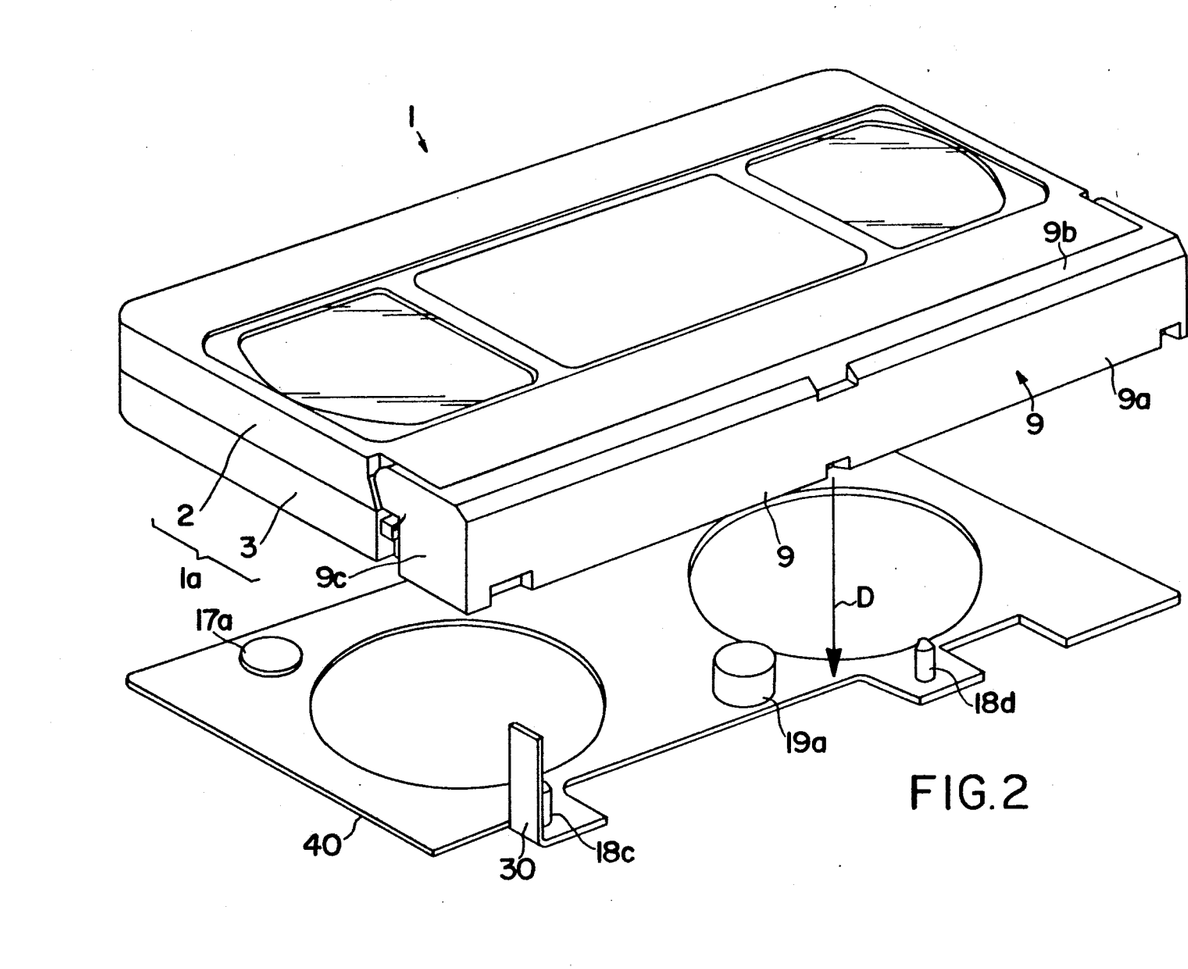
FIG. 2 is a perspective view of the tape cassette shown in FIG. 1 in an assembled state and a cassette support platform of a tape apparatus.
Figure 6A:
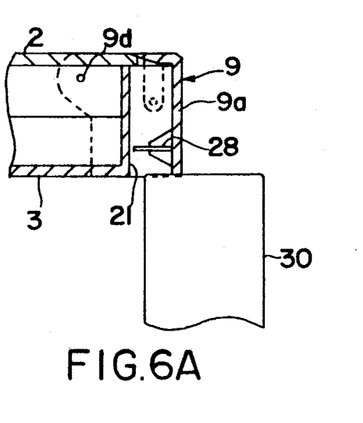
FIGS. 6A to 6E are a series of fragmentary cross-sectional views, taken along a line B—B in FIG. 3, for explaining a lid opening action of the cassette.
Figure 6B:
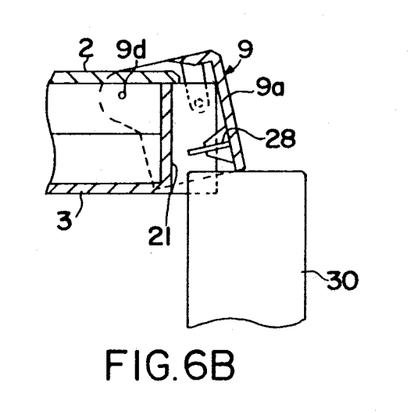
Figure 6C:
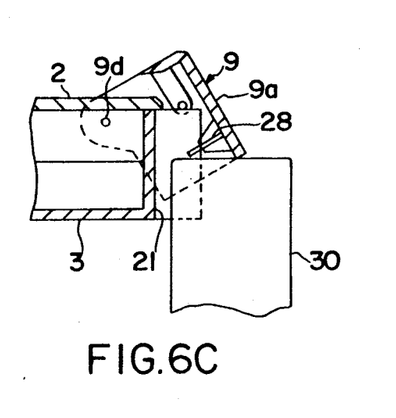
Figure 6D:
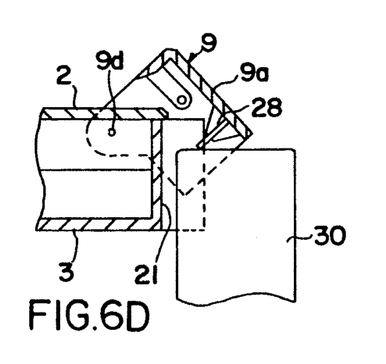
Figure 6E:
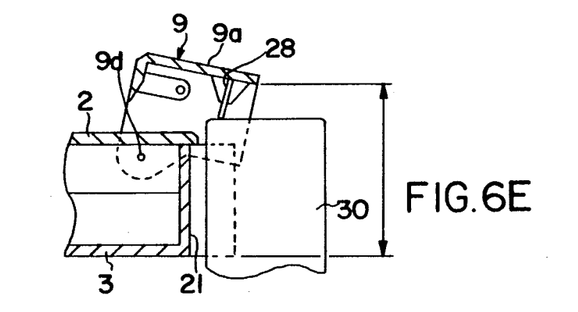

More specifically, when the tape cassette 1 is inserted into a cassette holder of, for example, a video tape recorder and then moved downwardly in the direction D shown in FIG. 2 to the cassette loading position, the lower edge of the front lid 9 is brought into contact with an upper edge of a lid opening member 30 disposed at the cassette loading position, as shown in FIG. 6A. As the tape cassette 1 is further moved downwardly, with the lid opening member 30 entering the recess 21 from its lower side, the outer lid 9 is pushed up and rotated upwardly about the pivot pins 9d (FIG. 6B). Part-way through the rotation of the outer lid 9, the portion abutting the lid opening member 30 changes from the lower edge of the front wall 9a of the outer lid 9 to the rear end edge 28a of the abutment 28 (FIG. 6C). A further downward movement of the tape cassette 1 causes the outer lid 9 to be pushed up by the member 30 acting only on the abutment 28 (FIG. 6D). Thereafter, when the tape cassette 1 is completely loaded at the cassette loading position, the outer lid 9 is fully pushed up by the lid opening member 30 acting on the end edge 28a of the abutment 28, thereby terminating the lid opening action (FIG. 6E). The outer lid 9 with the abutment 28, at its final opening position, is more widely opened in comparison with an outer lid which is pushed up by the member 30 acting only at the lower edge of the front wall 9a without having such an abutment.

Figure 4B:
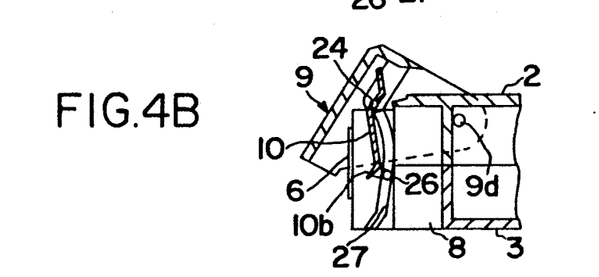

During the lid opening of the outer lid 9, the inner lid 10 is upwardly rotated about the pair of supporting pins 24, and the pair of guide pins 26 of the inner lid 10 are guided by the pair of guide grooves 27 of the cassette body 1a to move the inner lid 10 upwardly and rearwardly as shown in FIG. 4B. In other words, the inner lid 10 is moved away from the inner surface of the front wall 9a of the outer lid 9 with its lower edge 10b being rapidly moved away from the rear side of the magnetic tape 6. This action ensures that the magnetic tape 6 will not be damaged by contact with the front lid 9 or inner lid 10 even if the magnetic tape 6 is slightly loose or slack.

Figure 4C:
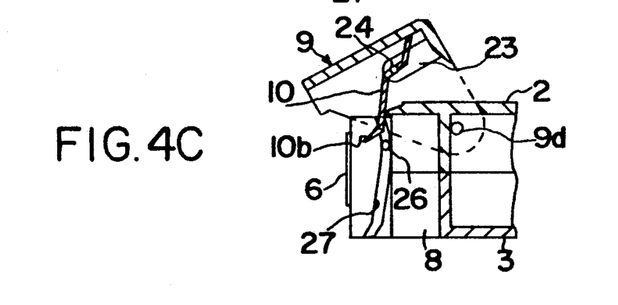

In the middle phase of the lid opening action, the pair of guide pins 26 of the inner lid 10 are guided along a substantially vertical portion of the pair of guide grooves 27, and hence the inner lid 10 is moved as shown in FIG. 4C, that is, with its lower edge 10b moved in a substantially vertical direction with a sufficient distance separating it from the rear surface of the magnetic tape 6.

Figure 4D:
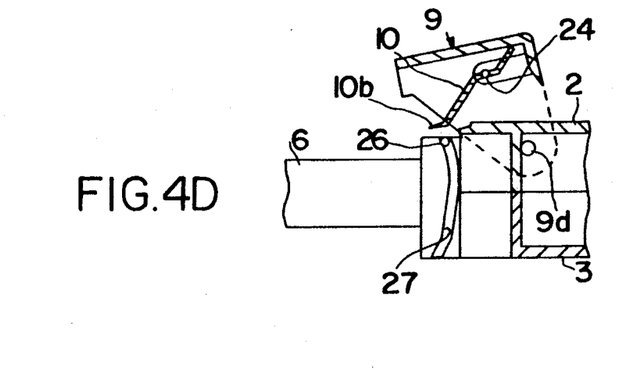
Figure 5:
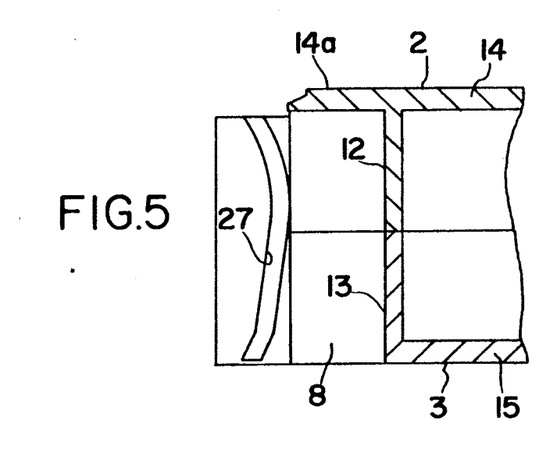
FIG. 5 is an enlarged fragmentary side elevational view partly in cross-section showing a guide groove of the tape cassette housing.

In the final phase of the lid opening action, the inner lid 10 is rotated about the supporting pins 24 by the upward movement of the pair of guide pins 26 toward the upper end of the pair of guide grooves 27, as shown in FIG. 4D, so that the lower edge 10b of the inner lid 10 is positioned above the mouth 8 of the cassette housing 1a and hence the mouth 8 is completely opened. It is therefore possible to insert the tape loading guides fully into the mouth 8 and thereby ensure reliable loading of the magnetic tape 6.

Having described the lid opening action performed when the tape cassette 1 is loaded to the cassette loading position in the video tape recorder with reference to FIGS. 4A-4D, it will be understood that, when the tape cassette 1 is withdrawn from the video tape recorder, the outer lid 9 and the inner lid 10 are closed by an action which is the reverse of the above described lid opening action.

In the embodiment described above, the outer lid 9 with the inner lid attached thereto is provided with the projecting abutment 28 which is brought into contact with the lid opening member 30 during the lid opening action. The outer lid 9 is opened through this projecting abutment 28 which is pushed up by the lid opening member 30, so that, even if the lid opening member 30 has a height which is only just sufficient to open the lid of an ordinary tape cassette, that is, one without an inner lid, the inner lid 10 can be rotated over a wider angular range to a position above the mouth 8 which is therefore completely clear.

Thus, it will be understood that the tape cassette embodying the present invention is fully compatible or interchangeable with conventional VHS type tape cassettes having no inner lid.

Incidentally, although the outer lid 9 of the cassette described above may be provided with biasing means for urging the outer lid 9 in the closing direction, locking means and so on, these elements are well known in the art so that explanation and illustration thereof is necessary.

Figure 7:
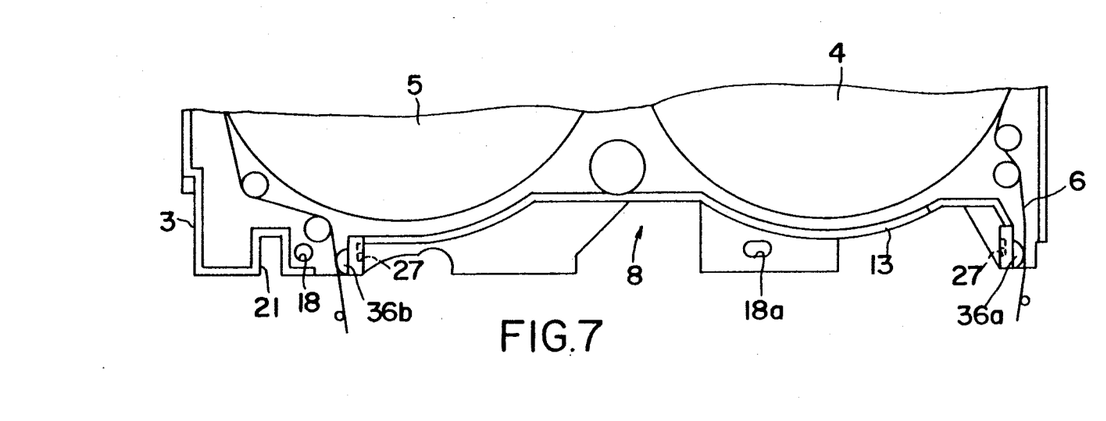
FIGS. 7 and 8 are partially cutaway plan views showing two modifications to a lower half of the tape cassette of FIG. 1.

In the described embodiment of the tape cassette 1, the mouth 8 is slightly smaller in the lateral direction than that of the conventional VHS type tape cassette. However, it can be made the same size as the conventional one by employing tape guides 36a, 36b which are substantially half-circular in cross-section, as shown in FIG. 7.

Figure 8:
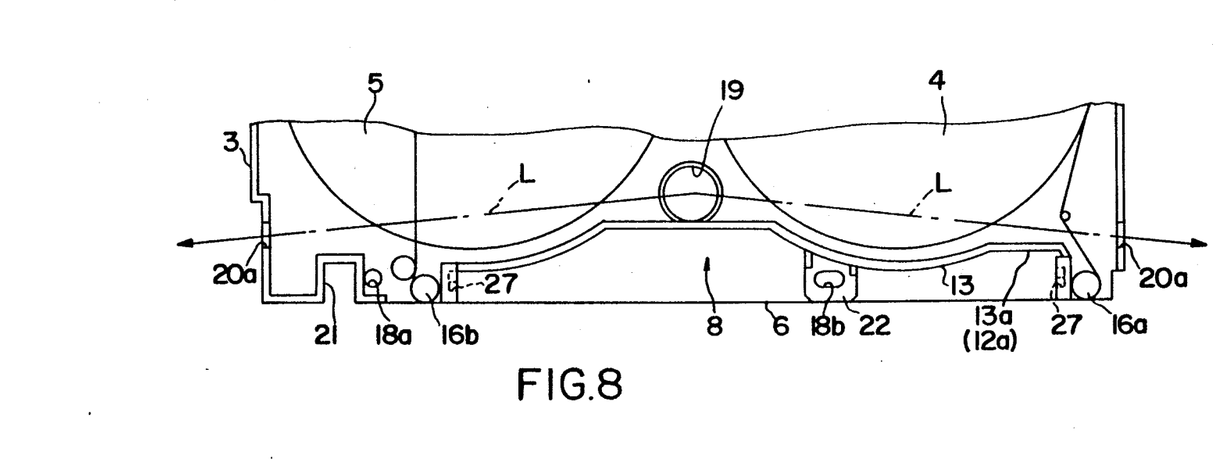

Also, portions 12a and 13a of the front walls 12, 13 of the respective upper and lower housing halves 2 and 3 may be displaced toward the front, as shown in FIG. 8, such that a light path L from the light receiving window 20a to a sensor in the hole 19 is not interrupted by the front walls 12, 13.

As described above, the tape cassette according to the present invention is provided with an inner lid attached to an outer lid thereof to seal therebetween substantially completely a magnetic tape run and thereby improve the dustproof effect, and both the lids can be opened by means of a lid opening member designed to open the front lid of a conventional tape cassette without the inner lid, so that compatibility with the conventional tape cassettes is ensured, with the result that the tape cassette described above can be used in any existing recording and/or reproducing apparatus without modification of the apparatus.

Having described a preferred embodiment of the invention with reference to the accompanying drawings, it is to be understood that the invention is not limited to that precise embodiment and the various changes and modifications thereof may be effected by one skilled in the art without departing from the spirit or scope of the invention as defined in the appended claims.

What is claimed is:

1. The combination of a tape recording and/or reproducing apparatus comprising a platform having means thereon defining a cassette loading position, and an upstanding lid-opening member extending from a front edge portion of said platform adjacent one side of the latter and having an upper end surface of substantial extent at right angles to said front edge portion; and a tape cassette comprising a housing having a front edge wall with a mouth formed in said front edge wall, said housing being adapted to be moved downwardly onto said platform at said cassette loading position with said front edge wall of the housing substantially overlying said front edge portion of the platform, a pair of tape reels rotatable in said housing, a magnetic tape wound on and extending between said tape reels and having a run extending across said mouth, an outer lid pivotally attached to said housing for movement upwardly from a closed position in which a laterally extending portion of said outer lid covers an outer surface of said run of the tape to a raised opened position for exposing said run, an inner lid linked to said outer lid for movement therewith between closed and opened positions of said inner lid in response to movements of said outer lid to said closed and opened positions, respectively, of the outer lid, and an abutment projecting rearwardly from said laterally extending portion of the outer lid adjacent an edge of the latter which is at the bottom of the outer lid in said closed position thereof, said abutment being positioned adjacent one end of said laterally extending portion of the outer lid to be laterally aligned with said lid-opening member as the tape cassette housing is moved downwardly to said cassette loading position so that, during initial downward movement of said housing toward said loading position with said outer and inner lids in their respective closed positions, said upper end surface of the lid opening member acts upwardly on said edge of the outer lid for raising the latter toward said opened position of the outer lid and, as downward movement of said housing to said cassette loading position is continued, said abutment is engaged by said upper end surface of the lid-opening member for further raising of said outer lid relative to said housing with said abutment extending below said edge of the outer lid in said opened positions of the latter for raising said edge of the outer lid substantially above said upper end surface of the lid-opening member.

2. The combination according to claim 1; in which, in said opened positions of the linked inner and outer lids, a lower edge of said inner lid is also substantially above said upper end surface of the lid-opening member.

3. The combination according to claim 1; in which said inner and outer lids are laterally elongated and have respective longitudinal centers with the longitudinal center of said inner lid being offset in a lateral direction away from said one end of the outer lid, and said inner lid is shorter in said lateral direction than said outer lid; and in which said mouth and said run of the tape are approximately coextensive with the length of said inner lid in said lateral direction.

4. The combination according to claim 3; in which said front edge of the cassette housing has a recess therein between said mouth and an end of said front edge adjacent said one end of the outer lid, said recess being disposed to receive said abutment when said outer lid is in said closed position thereof.

* * * * *